(No Model.)
C. M. THOMPSON.
SAND REEL.
No. 402,631. Patented May 7, 1889.
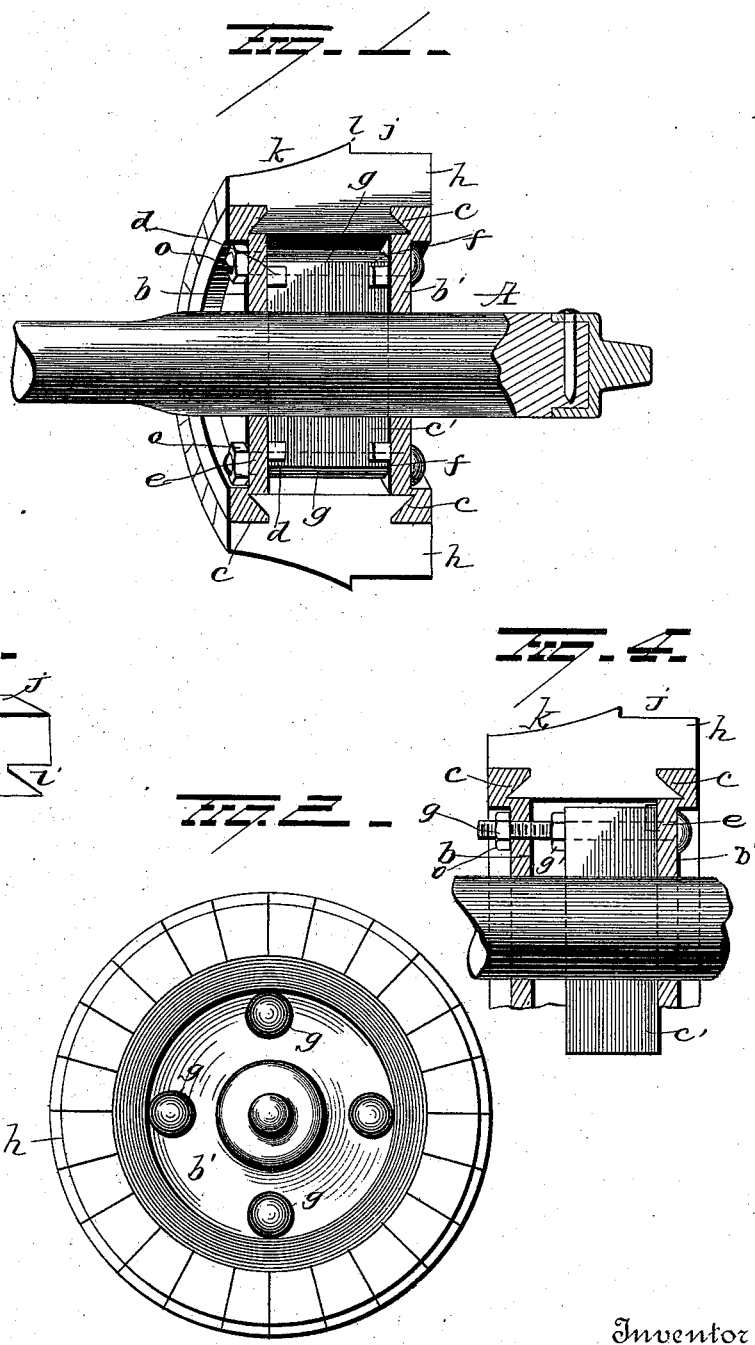

UNITED STATES PATENT OFFICE.

CALEB M. THOMPSON, OF GREENVILLE, PENNSYLVANIA.

SAND-REEL.

SPECIFICATION forming part of Letters Patent No. 402,631, dated May 7, 1889.

Application filed January 25, 1889. Serial No. 297,511. (No model.)

*To all whom it may concern:*

Be it known that I, CALEB M. THOMPSON, of Greenville, in the county of Mercer and State of Pennsylvania, have invented certain new and useful Improvements in Sand-Reels; and I do hereby declare the following to be a full, clear, and exact description of the invention, such as will enable others skilled in the art to which it appertains to make and use the same.

My invention relates to an improvement in sand-reels employed in drilling Artesian wells; and it consists in certain novel and peculiar features of construction, as will be hereinafter described, and pointed out in the claims.

In the accompanying drawings, Figure 1 is a view in perspective, taken through the center of the reel. Fig. 2 is an end view. Fig. 3 is a detail view of one of the segments. Fig. 4 is a modification.

A represents the shaft upon which the reel is secured. A pair of metal disks, b b', are mounted on this shaft, and these disks are similar in shape and each has an annular groove cut therein near the edge, said grooves being formed in the adjacent faces of the disks directly opposite each other. The shape of the grooves is substantially V-shaped; but the outer sides, c, of the grooves have a longer slope than the inner sides, and the purpose of this will be explained presently.

A feather or brace, c', passes through the shaft A, and small lugs d, projecting from one or both disks on each side of this feather, prevent the disk from turning on the shaft. The disks b b' are provided with several bolt-holes, e, and the feather c' extends to two of these holes diametrically opposite each other, its ends being provided with grooves f, which receive two of the bolts g, that hold the disks together. By this construction the disks are not only held together, but they are both held to the shaft and prevented from turning upon the latter. The feather may be made longer and have holes therein to receive the bolts g, and then nuts g', and screwed up tight against the feather, as shown in Fig. 4.

The letters h h represent the segments forming the outside of the reel. These are of peculiar shape, and a detailed description is essential. In the first place, they are wedge-shaped in section—*i. e.*, beveled on their contiguous edges like the edges of a barrel-stave. The outer side of these segments has a straight face, j, and a sloping face, k, with a rib, l, between said straight and sloping face, so that when the segments are all together the reel is cylindrical at one end and conical at the other, forming, respectively, a friction and a back brake. There is yet another peculiarity to be described, and which constitutes a very essential feature of the invention. These segments are provided with V-shaped recesses l' and pointed shoulders m, the former being adapted to receive the edges of the disks and the latter adapted to project into the annular grooves in the disks.

Now the importance of the peculiar formation of parts is made obvious by a glance at the drawings. With the parts assembled as shown it is only necessary to tighten the nuts o on the bolts. This draws the segments all in alike toward the shaft, due to the bearing contact of the sides c of the annular grooves and the corresponding sides of the recesses or notches l' in the ends of the segments. Any time it is necessary to tighten the reel it may be done in this way simply by tightening or turning on the nuts. In the event that the segments are a little green or wet when formed of wood, of course in time they may become dried up more or less, and in order to still insure tightness thin pieces of wood or leather may be inserted in the spaces between the segments. Then by turning on the nuts tighter all the spaces would be closed up tightly at once.

It is evident that slight changes might be resorted to in the form and arrangement of the several parts described without departing from the spirit and scope of my invention; hence I do not wish to limit myself to the exact construction herein set forth; but, Having fully described my invention, what I claim as new, and desire to secure by Letters Patent, is—

1. The combination, with a shaft, of disks, a key or feather secured to the shaft, bolts passing through the disks, devices for locking both disks to the key or feather, and a series of segments secured to and between the disks, substantially as set forth.

2. The combination, with a shaft and disks thereon, one of the latter being provided on its inner face with projections, of a key or feather secured to the shaft and engaging the projections on said disk, bolts, and a series of segments secured to and between the disks, substantially as set forth.

3. The combination, with a shaft and disks thereon, one of the latter having projections on its inner face, of a key or feather secured to the shaft and engaging the projections on said disk, bolts passing through the disks and end of the key or feather, and a series of segments secured to and between the disks, substantially as set forth.

4. The combination, with a shaft, disks mounted thereon, a feather passing through the shaft, and bolts passing through the disks and the end of the feather, whereby the disks are held together and prevented from turning on the shaft, of a series of segments secured to and between the disks, substantially as set forth.

5. The combination, with a shaft, disks having lugs thereon, feather, and bolts arranged substantially as described, of segments held between the disks, and nuts on the bolts adapted to be turned, whereby the disks are forced nearer together and the segments are forced nearer the shaft, substantially as set forth.

6. The combination, with a shaft and disks, the latter having annular V-shaped grooves therein, of segments having a straight and a slanting exterior face to form a combined friction and back brake with beveled sides and notched ends, and bolts for holding the disks firmly against the notched ends of the segments, and nuts whereby these disks may be drawn closer together, thereby forcing the segments nearer together and nearer to the shaft, substantially as set forth.

In testimony whereof I have signed this specification in the presence of two subscribing witnesses.

CALEB M. THOMPSON.

Witnesses:
PHILIP CLOVER,
ADAM MILLER.